Jan. 19, 1937.  J. W. LOGAN, JR  2,068,340
ELECTRIC AND FLUID PRESSURE BRAKE SYSTEM
Filed Feb. 28, 1936  2 Sheets-Sheet 1

Fig.1

INVENTOR
JOHN W. LOGAN, JR.
BY Wm. M. Cady
ATTORNEY

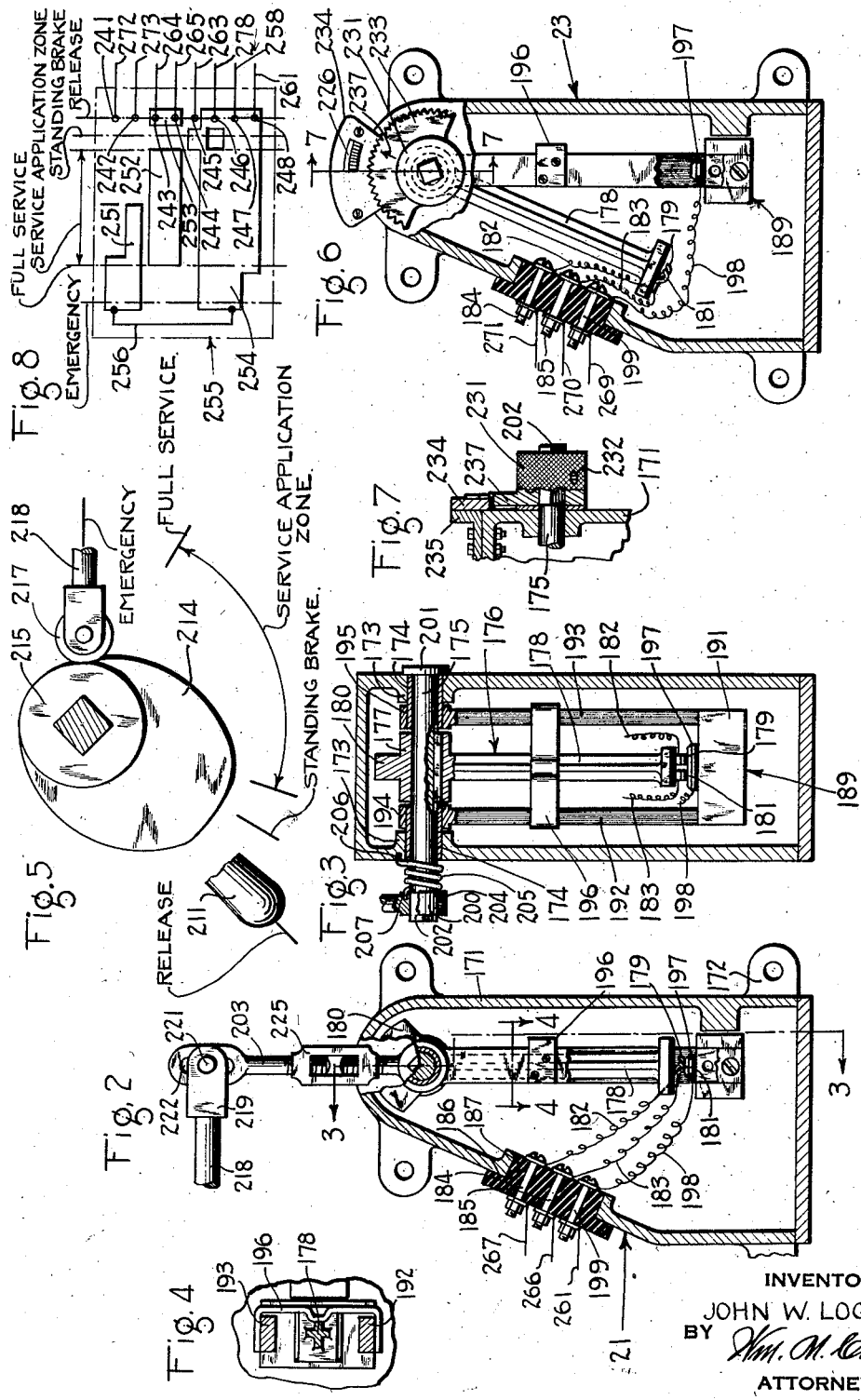

Patented Jan. 19, 1937

2,068,340

UNITED STATES PATENT OFFICE 2,068,340

ELECTRIC AND FLUID PRESSURE BRAKE SYSTEM

John W. Logan, Jr., Forest Hills, Pa., assignor to The Westinghouse Air Brake Company, Wilmerding, Pa., a corporation of Pennsylvania Application February 28, 1936, Serial No. 66,235

26 Claims. (Cl. 303—3)

This invention relates to vehicle brake systems having a fluid pressure brake and one or more types of electric brakes, and particularly to a control system for the various brakes which includes controlling devices for automatically limiting and regulating the rate of retardation of the vehicle.

Various brake equipments have been devised or proposed which comprise a fluid pressure operated brake and one or more types of electric brakes. It will be understood that the control of the various brakes may be effected in different ways and by different means and, according to my present invention, I propose to provide a novel control system for a fluid pressure operated brake, a magnetic track shoe brake and a dynamic brake, which system includes a so-called "brake valve" retardation controller of the type disclosed and claimed in my Patent No. 2,032,177, and assigned to the assignee of the present application.

This retardation controller is said to be of the "brake valve" type because it functions not only to limit and regulate the rate of retardation of the vehicle according to a selected value, but also to initiate the application of and to release the brake controlled thereby, thus duplicating the functions of the well known brake valve in fluid pressure brake systems, particularly those employed on railway trains. The retardation controller which I employ in my present invention thus differs from other types of retardation controllers which function only to limit and regulate the rate of retardation of the vehicle according to a selected value.

According to my invention, I propose to cause application of one or more of the various types of brakes, according to the degree of braking and the rate of retardation of the vehicle desired, the fluid pressure brake being applied first. The retardation controller controls only the fluid pressure brake so that as the other types of brakes are applied, the retardation controller functions automatically to decrease the degree of application of the fluid pressure brake so as to cause it to provide only such proportion of the total retardation force required to effect a selected rate of retardation for the vehicle or train of cars as is not provided by the other brakes.

As will be seen hereinafter, it is an inherent characteristic of my brake valve type retardation controller to automatically cause a full application of the fluid pressure brake when the vehicle is stopped, in order to guard against undesired creepage of the vehicle. Such requirement, while on the side of safety, imposes an undue and unnecessary penalty in most instances, because a relatively small fraction of the full brake cylinder pressure is in reality necessary to hold a car or train of cars against movement while on a substantially level track, the penalty being evidenced by the delay in starting due to the time required to release the air or other fluid from the brake cylinder to release the brakes, as well as the waste of fluid over and above the amount necessary to hold the car against creepage on a level track.

I have accordingly included as a part of my present invention means for enabling the application of the vehicle fluid pressure brakes to a degree which is only a fraction of the full degree of application, while the vehicle or car is stopped, but at the same time enabling a full application of the fluid pressure brakes to be obtained immediately in the event that it is necessary, as when the fraction of the full application is inadequate to hold the car or vehicle against creepage on a steep grade.

It is therefore an object of my invention to provide a novel control system for a vehicle brake equipment including a fluid pressure operated brake, a magnetic track shoe brake and a dynamic brake.

Another object of my invention is to provide a brake control system of the character indicated in the foregoing object, in which a retardation controller of the brake valve type is provided for controlling only the fluid pressure operated brakes.

Another object of my invention is to provide a brake control system which enables the operator to continue to cause power current to be supplied to the propelling motors of the vehicle or car at the same time that the fluid pressure brakes, or the fluid pressure brakes and the magnetic track shoe brakes together, are applied but which is automatically effective to interrupt the supply of power current to the propelling motors independently of the will of the operator whenever dynamic braking is called for.

A further object of my invention is to provide a brake control equipment including a retardation controller of my so-called "brake valve" type, which is manually operated to select a desired rate of retardation for the vehicle for service applications of the brake, and an emergency retardation controller, effective only when the service retardation controller is not effective.

A still further object of my invention is to provide for rendering the service retardation controller ineffective to control the rate of retardation of the vehicle for emergency applications of the brakes, either by manual operation or automatically by operation of a deadman's device or conductor's valve.

It is additionally an object of my invention to enable only a fraction of the full degree of application of the fluid pressure brake to be obtained when the vehicle is stopped, while at the same time enabling application of the fluid pressure brake to the full degree if required.

The above and other and more specific objects and advantages of my invention, which will be made apparent subsequently, are obtained by means of an illustrative embodiment of my invention, described hereinafter and shown in the accompanying drawings, wherein—

Fig. 1 is a diagrammatic view showing the organization of parts comprising my invention, certain parts being indicated in section, Fig. 2 is a front view of the service retardation controller shown in Fig. 1, on enlarged scale, the casing being broken away to show details of the operating mechanism, Fig. 3 is a view, substantially along the line 3—3 of Fig. 2, showing further details of construction of the service retardation controller, Fig. 4 is a fragmentary sectional view taken on the line 4—4 of Fig. 2 and also showing further details of construction of the retardation controller, Fig. 5 is a view, taken along the line 5—5 of Fig. 1, showing on enlarged scale and in detail the construction of the cam associated with the manually operable brake controller of Fig. 1, a portion of the operating handle of the controller being shown, Fig. 6 is a front view on enlarged scale, of the emergency retardation controller shown in Fig. 1, the casing being broken away in order to show the operating parts, Fig. 7 is a fragmentary sectional view, taken on the line 7—7 of Fig. 6, showing a detail of construction thereof.

Fig. 8 is a diagrammatic development view of the control drum, which is a part of the manual brake controller shown in Fig. 1, showing the various circuit connections established thereby for the various operating positions of the controller.

*Brief description of equipment*

Referring to Fig. 1 of the drawings, the brake equipment shown therein includes a brake cylinder 10 for operating a brake device (not shown), an electro-magnetic track shoe brake 11, and a dynamic brake 12, the latter comprising the propelling motors 13, 14, 15 and 16 of the vehicle.

Fluid under pressure is supplied to the brake cylinder 10 from a main reservoir 18 under the control of a valve mechanism 19, which serves also to control the release of fluid under pressure from the brake cylinder 10.

Operation of the valve mechanism 19 is controlled by a service retardation controller 21 and an emergency retardation controller 23, the service retardation controller 21 being of the so-called "brake valve" type and actuated in part by means of a manually operable brake controller 22.

Manual control over the magnetic track shoe brake 11 and the dynamic brake 12 is exercised by the brake controller 22, and automatic control of the track brake 11 and the dynamic brake 12 is effected by means of a pressure operated relay device 25, controlled according to the pressure of fluid in a safety control pipe 26. Deadman's control of the brakes is effected in the usual manner by valve means under the control of the handle of motor controller 21 and by the foot-valve device 28, which function as described in detail hereinafter, to maintain a supply of pressure in the safety control pipe 26 from the main reservoir 18, as long as the operating levers of either one or both are depressed, but which function when the operating levers of both are simultaneously in raised position to effect reduction in the pressure in the safety control pipe 26. A conductor's valve device 29 functions, independently, to reduce pressure in the safety control pipe 26.

DETAILED DESCRIPTION

*(a) The magnetic track shoe brake*

Referring to Fig. 1 in further detail, the track shoe brake 11 comprises one or more magnetic track shoes, such as the magnetic track shoe 31 associated with one of the track rails 32, the shoe 31 carrying an electro-magnet coil 30 in insulated relation thereon and being normally held out of engagement with the track 32 in any suitable manner, as by a bell-crank lever 33 pivoted at the fulcrum thereof on a portion 34 of the wheel truck or car frame, and biased to a position for maintaining the track shoe 31 out of engagement with the track 32 by fluid under pressure supplied to a chamber 35 at one side of a piston 36 connected to one arm of the bell crank lever 33 by a stem 37 and contained in a piston cylinder 38. Upon the release of fluid under pressure from the piston chamber 35, track shoe 31 falls into contact with the rail 32 due to gravity.

An electro-magnet valve device 41 is provided for controlling the supply and the release of fluid under pressure to and from the piston chamber 35, the magnet valve device comprising a double beat valve 42 contained in a chamber 43 of the casing of the magnet valve device, the valve 42 being urged in one direction by a spring 44 and operated in the opposite direction against the force of the spring 44 by an electro-magnet or solenoid 45 contained in the casing. The chamber 43 is connected to the piston chamber 35 of the pressure cylinder 38 by pipe or conduit 46 and when the electro-magnet 45 is deenergized, the spring 44 urges the double beat valve 42 into a position to establish communication between the chamber 43 and a chamber 48 in the casing of the magnet valve device, which latter chamber is in communication with and charged with fluid under pressure from the main reservoir 18 through the main reservoir pipe 49 and a branch pipe 50. When the electro-magnet 45 is energized, the valve 42 is actuated to cut off communication between the chamber 43 and the chamber 48, and to open communication between the chamber 43 and a chamber 51 in the casing of the magnet valve device which is constantly open to the atmosphere through a port 52. It will thus be seen that when the electro-magnet of the magnet valve device 41 is energized, fluid under pressure is released from the piston chamber 35 of the pressure cylinder 38 to cause engagement of the track shoe 31 with the rail 32, and that when the electro-magnet 45 is de-energized fluid under pressure is supplied to the chamber 35 from the reservoir 18 to maintain the track shoe 31 out of engagement with the rail 32.

The electro-magnet 30 carried by the track shoe 31 is energized from an external source, not shown, which has one terminal grounded and the other terminal connected to a supply conductor, trolley wire or third rail 54. A relay 55, comprising a solenoid coil 56 and a bridging member 57 actuated upon energization of the solenoid 56 to connect a pair of stationary contact members 58 and 59, serves to control energization of the electro-magnet 30 on the track shoe 31.

Operation of the electro-magnet valve device 41 and the relay 55 is effected under the control of the manually operable brake controller 22 and also independently of controller 22, by relay device 25 in the manner hereinafter described.

(b) The dynamic brake

In order to more readily describe the dynamic brake 12, the control system for the propelling motors 13, 14, 15 and 16 will be briefly described. It will be understood that, for simplicity, only the fundamental elements of the motor control are shown herein, any suitable and well known motor control system being employable. The armatures 13A and 14A and field windings 13F and 14F of propelling motors 13 and 14 respectively are connected in series relation, and the armatures 15A and 16A and field windings 15F and 16F of the propelling motors 15 and 16 respectively, are connected in series relation, the series related motors 13 and 14 being connected in parallel relation to the series related motors 15 and 16. A pair of motoring relays 61 and 62 are actuated under the control of the motor controller 27 to connect the propelling motors across the supply conductor 54 and ground, in series relation with a variable starting resistor 63 which is initially entirely included in the circuit and which is gradually shunted out of the circuit by movement therealong of a movable contact member 64. The movable contact member 64 is carried on a rack member 65 which is moved by a rheostat motor 66 through the medium of a pinion 67 driven by the motor and co-operating with the rack member 65. The rack member 65 is connected at one end to a piston 68 by a connecting stem 69, the piston 68 operating in a cylinder 71 having a chamber 72 at one side of the piston 68 which is constantly charged with fluid under pressure from the reservoir 18 through the main reservoir pipe 49 and branch pipe 50. Whenever the motoring relays 61 and 62 are actuated to energize the motors 13, 14, 15 and 16, the motor 66 is also energized to cause movement of the rack member 65 in the right-hand direction, as viewed in Fig. 1, against the force of the fluid pressure in the chamber 72 at the right of the piston 68 in the cylinder 71. The volume of the chamber 72 in the cylinder 71 is relatively small compared to the volume of the main reservoir 18 and thus the rack 65 is moved to the right against a substantially constant and yielding resisting force, which is immediately effective to return the rack 65 backwardly to its original position whenever the motor 66 is deenergized.

A current limiting relay 75, having a solenoid 76, connected in parallel relation across the motor field windings 13F and 14F, and a contact bridging member 77 actuated by the solenoid, upon energization of the solenoid, to connect a pair of stationary contact members 78 and 79, is provided for controlling a relay 81. The relay 81 comprises a solenoid coil 82 and a contact bridging member 83 actuated upon energization of the solenoid 82 out of connecting contact with a pair of stationary contact members 84 and 85, which are connected, respectively, to opposite ends of a resistor 86 included in series-circuit relation with the motor 66.

Whenever the voltage drop across the two field windings 13F and 14F rises above a predetermined value as determined by the current flowing therein, the solenoid 76 of the current limiting relay 75 is sufficiently energized responsive thereto to actuate the bridging member 77 into engagement with the contact members 78 and 79 to complete a circuit for energizing the solenoid 82 of the shunting relay 81, this circuit extending from supply conductor 54, through the movable contact device or trolley 87, conductors 88 and 89, contact members 78, 77 and 79 of the relay 75, conductor 91, solenoid 82 and conductor 92 to ground. Upon energization of the solenoid 82 of the relay 81, the bridging member 83 is actuated out of contact with the contact members 84 and 85 to remove the shunt normally established thereby across the resistor 86, and the resistor 86 is thus cut into the energizing circuit of the motor 66 to reduce the speed thereof, until such time as the current through the motor armatures 13A and 14A and through the motor field windings 13F and 14F is reduced sufficiently to cause the relay 75 to drop out and effect deenergization of the solenoid 82 of the relay 81. Upon deenergization of the solenoid 82 of the relay 81, the bridging member 83 again engages contact members 82 and 84 and thereby establishes the shunt around the resistor 86 to cut it out of the circuit of the motor 66 and thus permit the motor 66 to operate at the higher speed again. Rate of rise of starting current for the motors 13, 14, 15 and 16 is thus automatically controlled to prevent undue surges of starting current.

It should be understood that the motor 66 is so designed as to withstand the continued supply of current therethrough notwithstanding the stalling of the motor when the rack member 65 reaches the right-hand limit of its travel, in which all of the starting resistor 63 is cut out of the circuit of the motors 13, 14, 15 and 16.

A sufficient understanding of the motor control system should now be had so that a subsequent description of the dynamic brake system may be given. For the purpose of establishing the dynamic braking circuit connections to the motors 13, 14, 15 and 16, and also for simultaneously interrupting the motoring circuit of the motors independently of the position of the motor controller 27, a dynamic brake relay 95 is provided, the operation of which is under the control of either the manually operable brake controller 22 or the pressure operated relay device 25 associated with the safety control pipe 26, as will be made apparent presently. The dynamic brake relay 95 comprises a solenoid 96 and three movable contact bridging members 97, 98 and 99, all insulated from and moved by a plunger and stem 101 actuated by the solenoid. The bridging member 97 is normally, that is, when the solenoid 96 is de-energized, in circuit-closing position, enabling energization of the motoring relays 61 and 62 under the control of the motor controller 27.

The bridging member 99 is normally in circuit-opening position and is actuated into circuit-closing position upon energization of the solenoid 96 to complete a circuit, which will be hereinafter traced, for effecting energization of a pair of brake control relays 103 and 105. Before the bridging member 99 reaches circuit-closing position, however, the bridging member 97 is moved to circuit-opening position thus effecting deenergization of the motoring relays 61 and 62 and interrupting the supply of driving power or current to the motors 13, 14, 15 and 16 from supply conductor 54.

The brake relays 103 and 105, when energized, connect the starting resistor 63 in the circuit of the motors 13, 14, 15 and 16 in well known manner, so that the current generated by the propelling motors 13, 14, 15 and 16 acting as generators, is discharged therethrough.

The bridging member 98 of the dynamic brake relay 95 is normally in one circuit-closing position in series relation with a switch device operated by the motor controller 27, so that whenever the motor controller 27 is operated to "power-on" position, the circuit of the motor 66 is completed therethrough. When the solenoid 96 of the relay 95 is energized, however, the bridging member 98 is actuated into a second circuit-closing position, wherein it establishes a circuit for energizing the motor 66 independently of the switch device of the motor controller 27.

It will thus be apparent that upon the initial establishment of the circuit for dynamically braking the motors 13, 14, 15 and 16 the entire resistor 63 is cut in, and that the motor 66 operates, similarly as in motoring, to gradually cut out the resistor 63. It will also be apparent that the current-limiting relay 75 and the shunting relay 81 also function upon dynamic braking of the motors similarly as previously described in connection with the motoring circuit for driving the vehicle or car under power.

(c) *Fluid pressure brake control equipment*

The valve mechanism 19 comprises a casing 107 having embodied therein an application magnet valve device 108, a release magnet valve device 109, a by-pass magnet valve device 111, and a cut-off valve device 112.

The application magnet valve device 108 comprises a valve 114 contained in chamber 115 which is in constant communication with the brake cylinder 10 through a passage 116 which opens into another passage 117 leading to the brake cylinder, valve 114 being unseated from its associated valve seat 118 by a coil spring 119 to establish communication between the chamber 115 and a chamber 121 which is in constant communication with the main reservoir 18 through a passage and pipe 122 which opens into the main reservoir pipe 49. The valve 114 is actuated into its seated position on the valve seat 118 against the resisting force of the spring 119 to cut off communication between the chambers 115 and 121, upon energization of a solenoid or electromagnet coil 123, by means of a plunger 124.

The release magnet valve device 109 comprises a valve 127 contained in a chamber 128 which is in constant communication with the brake cylinder passage 117 through a branch passage 129, the valve 127 being yieldingly urged into seated relation on its associated valve seat 131 by a coil spring 132 contained in the chamber 128 to cut off communiaction between the chamber 128 and a chamber 133 which is constantly open to atmosphere through a port 134. Valve 127 is unseated from the valve seat 131, upon energization of a solenoid or electromagnet coil 135, by means of a plunger 136 which contacts the end of the fluted stem 137 of the valve 127.

The by-pass magnet valve device 111 comprises a valve 139 which is contained in a chamber 141, and a coil spring 142 which is disposed in a chamber 143 and acts on the end of the fluted stem 144 of the valve 141 to unseat the valve 139 from its associated valve seat 145 to establish communication between the chamber 141 and 143. Upon energization of a solenoid or electromagnet coil 146, the valve 139 is actuated through the medium of a plunger or stem 147 and against the force of spring 142 into seated relation on its valve seat 145 to cut off communication between the chambers 141 and 143.

The chamber 143 is in constant communication with and is supplied with fluid under pressure from the main reservoir 18 through the main reservoir pipe 49, branch pipe and passage 122, and a second branch passage 149. The chamber 141 is connected through a passage 151 with a chamber 152 of the cut-off valve device 112.

The cut-off valve device 112 comprises a piston 153, having at one side thereof a chamber 154 and a fluted stem 155 extending through a suitable bore 156 in the casing into the chamber 152, a valve 157 of the disc type being secured to the end of stem 155 within the chamber 152 for co-operation with an annular rib seat 158. A chamber 154a at the opposite side of the piston 153 relative to chamber 154 is constantly open to atmosphere through a passage 159 and contains a coil spring 161 interposed between the casing and the face of the valve 153 for yieldingly urging the piston 153 against a stop shoulder 162 in the chamber 154, in which position the valve 157 is unseated from the rib seat 158 to open communication from the chamber 152 through bore 156 to a chamber 164 located between the chambers 152 and 154. The chamber 164 is in constant communication with the brake cylinder 10 through the passage and pipe 117 and also with the chamber 154, at the one side of the piston 157, through the bore 156 and a plurality of grooves 163 in the face of the stop shoulder 162.

The manner in which the magnet valve devices 108, 109 and 111 are controlled will be described hereinafter.

(d) *The service retardation controller*

The service retardation controller 21, as shown in Figs. 2, 3 and 4, comprises the casing 171 having a plurality of projecting lugs 172 whereby the casing is secured to the vehicle or car structure and, at the upper portion thereof, a pair of journals 173 each provided with a bushing 174 for receiving a shaft or a pin 175.

Disposed centrally within the casing 171 is a member 176 having a hub portion 177 adjacent one end thereof through which the shaft 175 extends and which is keyed or otherwise suitably secured to the shaft 175. The member 176 is formed with a relatively long arm 178 extending downwardly from the hub 177 and with a counterweight sector portion 180 of short radius relative to the length of the arm 178, the counterweight portion extending upwardly from the hub 177 in the plane of the arm 178. A pair of spring contact members 179 and 181 are secured in any suitable manner in transverse and longitudinal spaced relation in insulated relation on the end of the arm 178, the contact members 179 and 181 being connected by flexible wires 182 and 183, respectively, to the inner end of terminal bolts or screws 184 and 185 suitably mounted in an insulating member 186 which fits into an opening 187 in the wall of the casing 171 and which is secured to the casing 171 in any suitable manner.

A pendulum member 189 is provided which comprises a weighted portion 191 supported for pivotal movement relative to the axis of the shaft 175 by means of a pair of supporting arms 192 and 193, each of which has a hub 194 at the end thereof and through which an extension of the inner end of one or the other of the bushings 174 extends. As seen in Fig. 4, a U-shaped strap 196 has its opposite end flanges secured respectively to the supporting arms 192 and 193 of the pendulum device 189 at a suitable point intermediate the shaft 175 and the weighted portion 191, the purpose of this strap 196 being to prevent the pendulum member 189 from swinging past the arm 178 of the movable member 176. A contact member 197 is carried in insulated relation on the upper face of the weighted member 191 in alignment with the arm 178 of the movable member 176 for co-operatively contacting the contact members 179 and 181, the contact member 197 being connected by a flexible wire 198 to the inner end of a terminal bolt 199 carried in the insulating member 186.

The contact members 181 and 179 are disposed in longitudinal spaced relation so that upon movement of the arm 178 in the left-hand direction, they successively disengage the contact member 197 on the pendulum device in the order named.

The shaft 175 is provided at one end with a flange or head 201 and is of such length that when the head 201 engages one face of the casing 171 following insertion of shaft 175 through one of the bushings 174, the other end, which is provided with a square portion 202, projects out of the casing from the opposite face of the casing. An operating arm or rod 203 is provided for rotating the shaft 175 and has a collar 200 at one end thereof which is provided with a square opening therein for receiving the square end portion 202 of the shaft 175, a set screw 204 being provided for securing the rod 203 against sliding movement along the shaft 175. A helical torsion spring 205 having the opposite ends thereof secured in suitable recesses 206 and 207 in the casing 171 and the collar 200 of rod 203, respectively, yieldingly resists rotation of the shaft 175 out of its normal position in which the arm 178 is vertically oriented, and acts to return the arm 178 toward its vertical position whenever the force acting on the rod 203 and holding the arm 178 out of its vertical position is relieved or removed.

Operation of the actuating arm 203 is effected by rotation of the operating handle 211 of the brake controller device 22. (See Fig. 1.) The control drum (not shown) of the controller 22 is adapted to be correspondingly rotated upon rotation of the handle 211 and is provided with a shaft or stem 213 having a square end portion which projects exteriorly of the casing of controller 22. A cam 214, having a hub portion 215 which slides over the end of the stem 213 in interlocking relation and which may be secured thereto in any desired longitudinal position thereon as by a set screw, not shown, is provided for co-operatively engaging a roller 217 suitably mounted at one end of the rod 218, the opposite end of which rod 218 is provided with a suitable clevis 219. The clevis 219 is secured to the free end of the rod 203 by a pin 221 which extends through an elongated opening 222 at the free end of the rod 203.

The operating rod 218 is supported by a plurality of brackets 223 which may be adjustably positioned as desired on supporting member 224 of the vehicle structure, depending upon the length of the operating rod 203 as determined by the adjustment of the turn-buckle 225 (Fig. 2) of the rod 203.

As indicated in Figs. 5 and 8, the handle 211 of the brake controller 22 is normally positioned in release position and upon operative movement out of release position successively passes through a standing brake position and a service application zone into emergency position. The cam 214 is of such contour that rotary operative movement of the brake controller handle 211 from release position up to the beginning of the service application zone effects only slight movement of the rod 218 to the right-hand direction and consequently an insufficient amount of movement of the movable member 176 of the service retardation controller 21 to effect separation of contact members 179 and 181 from contact member 197 carried on the pendulum member 189. The contour of the cam 214 is such, however, that further operative movement of the controller handle 211 into and through the service application zone to the full service position, causes longitudinal movement of the rod 218 and swinging of the movable arm 178 in the left-hand direction, according to the movement of the controller handle 211, to effect separation of contact members 179 and 181 from contact member 197 on the pendulum member 189.

The contour of the cam 214 is further so designed that upon operative movement of the controller handle 211 beyond the full service condition and into emergency position, no further movement of the operating rod 218 and of the movable arm 178 of the service retardation controller 21 occurs. The reason for such construction will be apparent hereinafter.

Variation in the degree of angular movement of the movable member 176 out of the vertical for a given operative movement of the controller handle 211 may be effected by adjusting the turn-buckle 225 to vary the length of rod 203.

(e) *The emergency retardation controller*

The emergency retardation controller 23 is substantially similar in construction to the service retardation controller 21, and corresponding parts in the two retardation controllers are, therefore, designated by the same reference numerals. The emergency retardation controller 23 differs from the service retardation controller 21 in that the arm 178 of the movable member 176 of the emergency retardation controller is adapted to be fixed or held in any desired position at an angle to the vertical, in displaced relation to the pendulum member 189, by means of a collar 231 (see Figs. 6 and 7) which interlockingly fits over the square exterior end portion 202 of the shaft 175 and which is secured to the shaft by a set screw 232, the collar 231 having a toothed sector 233 adapted to interlockingly engage the toothed portion of a dial or position indicator member 234 which is suitably secured to the casing 171 as by an angle bracket 235. The toothed dial member 234 has a scale 236 on the face thereof which in cooperation with an arrow head 237 on the face of the toothed section of the collar 231 serves to indicate the relative degree of displacement of the movable arm 178 out of the normal vertical position of the pendulum member 189.

The arm 178 is normally displaced from the vertical at an angle which is greater than the maximum degree of angular displacement of the arm 178 of the service retardation controller 21 from the vertical. However, if it is desired to vary the angle of displacement of the movable arm 178 of the emergency retardation controller 23 with respect to the vertical, the set screw 232 is loosened, the collar 231 is moved outwardly along the shaft 175 until the teeth on the sector 233 disengage the teeth on the toothed dial member 234, and collar 231 and shaft 175 are then rotated together in either direction to the desired position, after which the collar 231 is returned inwardly along the shaft to effect co-operative engagement of the toothed sector 233 with the toothed member 234, and the set screw 232 is finally tightened to hold shaft 175 and arm 178 in position.

*(f) Safety control equipment*

The fluid pressure operated relay 25 (Fig. 1) comprises a casing 301 containing a piston 302 having a chamber 303 at one side thereof and a chamber 304 on the opposite side thereof, the piston 302 having a stem 305 extending to the exterior of the casing 301 for simultaneously actuating a plurality of movable contact members 306, 307, 308 and 309. The chamber 304 is constantly connected to the safety control pipe 26 and when supplied with fluid under pressure, as it normally is when either one or both the motor controller 27 and the foot valve device 28 are properly conditioned as described hereinafter, the piston 302 is urged against the force of a coil spring 310 interposed in the chamber 303 between the casing 301 and the face of the piston 302, into contact with a stop shoulder 312 formed in the casing. When the piston 302 engages the stop shoulder 312, the contact members 306 and 307 are urged into engagement with stationary contact members 313 and 314, respectively, and the contact members 308 and 309 are separated from their respectively associated stationary contact members 315 and 316.

When the pressure in the safety control pipe 26 and in the chamber 304 of the relay device 25 is reduced sufficiently, the coil spring 310 is effective to move the piston 302 away from the stop shoulder 312 and effect separation of the contact members 306 and 307 from their associated contact members 313 and 314 and to effect engagement of the contact members 308 and 309 with their respectively associated contact members 315 and 316.

The circuits controlled by the contact members 306, 307, 308 and 309 will be described hereinafter.

The motor controller 27, the foot valve device 28 and the conductor's valve device 29 are of well known construction and will, therefore, be described only briefly herein. The motor controller 27 comprises a removable operating handle 321 adapted to be interlockingly inserted in a socket member 322 which is rotatable relative to the casing of the controller and which has a shaft 323 keyed within a bore 324 of the socket member 322 for effecting rotation of the usual motor controller drum indicated by the drum 326. For simplicity in describing the motor control circuit, the previously referred to control of the motoring circuits exercised by the motor controller 27 is shown as being effected through the medium of a contact segment 327 mounted in insulated relation on the drum 326, which segment is adapted to connect a pair of stationary contact members 328 and 329, whenever the motor controller handle 321 is rotarily operated to "power-on" position and which disengages contact members 328 and 329 in the "power-off" position of the motor controller handle 321.

When inserted in the socket member 322 the controller handle 321 is adapted to fulcrum at an intermediate point with respect to the ends of the control handle on a pin 331 secured to the socket member 322, and the inner bifurcated end 333 of the handle 321 straddles a valve operating stem 334. When the outer end of the controller handle 321 is pivotally depressed about the pin 331, the bifurcated end 333 engages a head or flange 335 at the upper end of the stem 334 to raise the stem against the force of a spring 336 interposed between the casing and a collar 337 secured to the opposite end of the stem 334.

A double beat valve 339 contained in a chamber 341 of the stationary casing is provided with a projecting flange 342, and a coil spring 343 interposed between the flange 342 and the casing yieldingly urges the valve 339 into seated relation on a valve seat 344 to cut off communication between chamber 341 which is connected to the foot valve device 28 by a pipe 345, and a chamber 346 which is open to atmosphere, while at the same time opening communication between the chamber 341 and chamber 347 connected to the main reservoir pipe 49. The double beat valve 339 is provided with a fluted stem 348 which is engaged at the end thereof by one arm of a pivoted lever 349, the other arm of the lever 349 being adapted to be engaged by the stem 334 and moved in a clockwise direction by the force of the spring 336 whenever the outer end of the controller handle 321 is raised, or the pressure thereon is relieved. Thus when the pressure on the outer end of the controller handle 321 is relieved, the rocking of the lever 349 by the spring 336 effects movement of the double beat valve 339 against the force of the spring 343 to unseat the valve from the valve seat 344 and to seat the valve on the opposite seat 348 to respectively cut off the supply of fluid under pressure from the main reservoir pipe 49 to the pipe 345 and open the pipe 345 to atmosphere.

The foot valve device 28 comprises a casing 351 having a chamber 352 which is in connection with the safety control pipe 26, a valve 353 disposed in a chamber 354 which is connected through a passage and pipe 355 to the main reservoir pipe 49 for controlling communication between the chambers 352 and 354, and a diaphragm valve 356 for controlling communication between chamber 352 and a chamber 357 to which the pipe 345 leading from chamber 341 of the motor controller device 27 is connected. The valve 353 has a fluted stem 358 which engages the diaphragm valve 356, a coil spring 359 interposed between the valve 353 and the casing being effective to urge the valve 353 into seated position to close communication between the chambers 352 and 354 and to unseat the diaphragm valve 356 from its annular rib seat 361 to open communication between the chambers 352 and 357.

A foot pedal or lever 362, pivoted on a pin 363 carried on the casing of the foot valve device 28, is biased upwardly by a coil spring 364 interposed between the lever 362 and the casing 351, and when depressed against the force of the spring 364 engages a follower 365 on the diaphragm valve 356 to seat the valve 356 on the rib seat 361 to close off communication between the chambers 352 and 357 and to unseat the valve 353 to open communication between the chambers 352 and chamber 354, against the resisting force of the spring 359.

The conductor's valve device 29 comprises a casing 371 having an atmospheric chamber 372, a chamber 373 connected to the safety control pipe 26 through a branch pipe 374, and a valve 375 for controlling communication between the chamber 373 and the chamber 372. The valve 375 is normally biased into seated relation on an annular rib seat 376 to close communication between the chambers 373 and 372 by a coil spring 377 interposed between the valve and a screw plug 378 closing the chamber 373.

The valve 375 is unseated from the rib seat 376 against the force of the spring 377 by means of a pivoted cam lever 379 which when pivoted in the usual manner by a pulling force exerted on a pull rod or cable 381 causes downward movement of another pivoted lever 382 which engages and moves the stem 383 of the valve 375.

(g) Control circuits

Referring to Fig. 8, a plurality of contact members 241 to 248, inclusive, are mounted in insulated relation within and on the casing of the brake controller 22, and a plurality of contact segments 251, 252, 253, and 254 are mounted in insulated relation on the drum of the controller 22, the drum being indicated by the broken line 255. Segments 251 and 254 are electrically connected as by a connector 256.

Contact member 247 is connected to the positive terminal of a suitable source of supply, such as the battery 257, by wires 258 and 259, the negative terminal of the battery being connected to ground. Contact member 248 is connected by a wire 261 to the outer end of the terminal bolt 199 on the service retardation controller 21. Contact segment 254 is so constructed as to connect the contact member 247 and 248 in all positions of the brake controller handle 211 except emergency position. Thus the contact member 197 carried on the pendulum member 189 of the service retardation controller 21 is connected to the positive terminal of battery 257 in all positions of the brake controller handle 211 except the emergency position.

The contact member 245 on the controller 22 is connected by a wire 263 to one terminal of the solenoid 123 of the application magnet valve device 108, the other terminal of the solenoid being connected to the negative terminal of battery 257 as by connection to ground. Contact member 243 of the controller 22 is connected by a wire 264 to one terminal of the solenoid of the release magnet valve device 109, the other terminal of the solenoid being connected to the negative terminal of battery 257 as by connection to ground.

The contact member 244 of the controller 22 is connected by a wire 265 to the contact member 306 of the fluid pressure relay 25, the contact member 313 engaged by the contact member 306 being connected by a wire 266 to the outer end of the terminal bolt 185 of the service retardation controller 21. The outer end of the terminal bolt 184 of the service retardation controller is connected by a wire 267 to contact member 314 of the relay 25 and the movable contact member 307 of the relay 25 is connected to the wire 263 leading to the solenoid 123 of the application magnet valve device 108 by a wire 268.

The contact member 246 of the brake controller 22 is connected by a wire 278 to one terminal of the solenoid 146 of the by-pass magnet valve device 111, the other terminal of the solenoid being connected to the negative terminal of battery 257 as by connection to ground.

The contact member 241 of the controller 22 is connected by a wire 272 to one terminal of the solenoid 96 of the dynamic brake relay 95, the other terminal of the solenoid 96 being connected to the negative terminal of the battery 257 as by connection to ground.

The contact member 242 of the controller 22 is connected by a wire 273 to one terminal of the solenoid 45 of the magnet valve device 41 of the magnetic track brake device 11, the other terminal of the solenoid 45 being connected to the negative terminal of battery 257 as by connection to ground. The solenoid 56 of the track brake relay 55 has one terminal connected to the wire 273 by wire 274 and the other terminal connected to the negative terminal of battery 257 as by connection to ground. The solenoid coils 56 and 45 of relays 55 and 41 are thus in parallel relation and are simultaneously energized whenever the wire 273 is connected to a source of supply.

The movable contact members 308 and 309 of the pressure relay 25 are both connected to the positive terminal of the battery 257 by the wire 259, contact members 315 and 316 respectively associated therewith being respectively connected to the wire 272 and to the wire 273, by wires 276 and 277 respectively.

The outer end of the terminal bolt 199 of the emergency retardation controller 23 is connected by a wire 269 to the wire 259 leading to the positive terminal of battery 257. The outer end of the terminal bolt 185 of the emergency retardation controller 23 is connected by wire 270 to the wire 264 leading to the solenoid 135 of the release magnet valve device 109. The outer end of the terminal bolt 184 of the emergency retardation controller device 23 is connected by wire 271 to the wire 263 leading to the solenoid of the application magnet valve device 108.

Operation

Assuming that the vehicle or train of cars is being driven along the road under power, with the motor controller handle 321 depressed, and in "power-on" position, the lever 362 of the foot valve device 28 released, the brake controller handle 211 positioned in release position, and the movable member 176 of the service retardation controller 21 operated by the controller 22 being accordingly positioned in its normal vertical position, fluid under pressure is supplied from the main reservoir 18 into safety control pipe 26 and chamber 304 of the pressure relay 25 through pipe 49, chamber 347 of the controller 27, past the double beat valve 339 which is unseated from the valve seat 348, chamber 341, pipe 345, chamber 357 of the foot valve device 28, past the diaphragm valve 356 which is unseated from its associated rib seat 361, and chamber 352. Pressure relay 25 is thus actuated to the position shown in Fig. 1 to actuate the contact members 306 and 307 thereof to circuit-closing position and to actuate the contact members 308 and 309 to circuit-opening position.

Fluid under pressure from the main reservoir 18 is also supplied to the chamber 72 of the pressure cylinder 71 associated with the rheostat motor 66 of the motor control system through pipes 49 and 50.

As will be noted in Fig. 8, the track brake magnet device 41 is not energized with the brake controller handle 211 in release position and, therefore, fluid under pressure from the main reservoir 18 is also supplied to the chamber 35 of the pressure cylinder 38 through pipes 49 and 50, chamber 48 of the magnet valve device 41, past the double beat valve 42, through chamber 43 and pipe 46, to rock the bell-crank lever 33 so as to raise the track shoe 31 out of engagement with the rail 32.

With the brake controller 22 in release position, contact members 243 and 244 are connected by the segment 253 and contact members 246, 247, and 248 are connected by the contact segment 254.

Circuits are accordingly established for energizing all of the magnet valve devices 108, 109 and 111 of the valve mechanism 19 as follows:

The application magnet valve device 108 is energized by a circuit extending from the positive terminal of the battery 257 through wires 259, 258, contact member 247 of the controller 22, contact segment 254 of the controller 22, contact member 248, wire 261, terminal bolt 199, flexible wire 198, contact members 197 and 179 of the service retardation controller 21, flexible wire 182, terminal bolt 184, wire 267, contact member 314 of pressure relay 25, contact member 307, wires 268 and 263, solenoid 123 of the application magnet valve device 108 and then to the negative terminal of the battery 257 through ground. The circuit for effecting the energization of the solenoid 135 of the release magnet valve device 109 is the same as that previously traced for the application magnet valve device 108 to the contact member 197 on the pendulum member 189 of the service retardation controller, the circuit thereafter extending through the contact member 181, flexible wire 183, terminal bolt 185, wire 266, contact member 313 of the relay 25, contact member 306 of the relay 25, wire 265, contact member 244 of the controller 22, contact segment 253 on the drum of the controller, contact member 243, wire 264, the solenoid 135 of the magnet valve device 109, and then to the negative terminal of battery 257 through ground. The circuit for energizing the by-pass magnet valve device 111 is the same as that for the application and release magnet valve devices 108 and 109 to the contact segment 254 of the controller 22, and then the circuit extends through the contact member 246, wire 278, solenoid 146 of the by-pass magnet valve device 111, and then to the negative terminal of the battery 257 through ground.

It will thus be seen that the supply of fluid under pressure from the reservoir 18 to the brake cylinder 10 is cut off by both the valve 114 of the application magnet valve device 108, and by the valve 139 of the by-pass magnet valve device 111, which valves are both seated, and that the brake cylinder is vented to atmosphere by way of pipe and passage 117, passage 129, chamber 128 of the release magnet valve device 109, past the valve 127, through chamber 133 and port 134.

As will be seen further in Fig. 8, the solenoid 96 of the dynamic brake relay 95 is de-energized and consequently the dynamic brake is not effective at this time.

*Service application*

If with the equipment conditioned as just described and as shown in Fig. 1, the operator desires to effect a service application of the brakes to a relatively low degree, it being understood that pressure in the safety control pipe 26 is suitably maintained, the operator turns the handle 211 of the brake controller 22 from release position in a counterclockwise direction, Fig. 5, into the service application zone a desired amount. The contact carrying arm 178 of the movable member 176 of the service retardation controller 21 is accordingly moved in the left-hand direction, as viewed in Fig. 2, into a position at an angle to the original vertical position, the angle of displacement corresponding substantially to the degree of angular movement of the brake controller handle 211 into the service application zone. It is important to note that the degree of movement of the contact carrying arm 178 is not in direct proportion to the total movement of the brake controller handle 211 in its movement from release position since the cam 214 is so designed that separation of the contact members 179 and 181 on the contact carrying arm 178 from contact member 197 on the pendulum member 189 is not effected until the controller handle 211 enters the service application zone, after which the degree of movement of the contact carrying arm 178 is in proportion to the rotary movement of the controller handle 211 only up to the full service application position, after which further rotary movement of the controller handle 211 into emergency application position is ineffective to increase the angle of displacement of the contact arm 178 from the vertical.

Assuming then that the brake controller handle 211 has been operatively rotated to a position just inside the service application shown, the movable contact arm 178 of the service retardation controller is moved to such an angle as to disengage the contact members 181 and 179 in succession from the contact member 197 on the pendulum member 189. The disengagement of the contact member 181 from the contact member 197 interrupts the circuit, previously traced for energizing the release magnet valve device 109 and the valve 127 of the magnet valve device 109 is accordingly seated by the spring 132 to close off the exhaust communication for the brake cylinder 10. The separation of the contact member 179 from the contact member 197 interrupts the circuit, previously traced, for energizing the application magnet valve device 108 and the valve 114 of valve device 108 is accordingly unseated to open communication for the supply of fluid under pressure from the main reservoir 18 to the brake cylinder 10 to initiate an application of the fluid pressure brake. Fluid is supplied from the main reservoir 18 to the brake cylinder 10 by way of pipe 49, branch pipe and passage 122, chamber 121 of the magnet valve device 108, past the unseated valve 114, chamber 115, passage 116, and passage and pipe 117.

Upon the fluid pressure brake becoming effective, the speed of the vehicle or train of cars is retarded and the pendulum member 189 of the service retardation controller 21 accordingly swings in a direction to follow the movable contact arm 178. When the brake cylinder pressure is sufficient to produce a braking effect such as to cause the contact member 197 on the pendulum member 189 to re-engage the contact member 179 on the movable arm 178, the circuit for energizing the application magnet valve device 108 is again completed and the valve 114 actuated into engagement with its seat 118 to close off the further supply of fluid under pressure from the reservoir 18 to the brake cylinder 10.

When the fluid pressure present in the brake cylinder becomes effective to increase the rate of retardation of the vehicle or car, as it does upon the decrease in speed of the car due to an increase in the coefficient of friction between the wheel-brake shoes and the wheels, the pendulum member 189 of the service retardation controller swings slightly more to the left-hand direction until the contact member 197, carried thereon re-engages the contact member 181, thereby re-establishing the circuit for energizing the release magnet valve device 109 and effecting release of fluid under pressure from the brake cylinder 10. Fluid under pressure is released from the brake cylinder until such time as the brake cylinder pressure is insufficient to product a rate of retardation adequate enough to maintain the pendulum member 189 sufficiently out of its normal vertical position to engage the contact member 181 on the movable arm 178. When the contact member 197 disengages the contact member 181 without, however, disengaging the contact member 179, the circuit for energizing the release magnet valve device 109 is again established and the further release of fluid under pressure from the brake cylinder 10 is cut off.

It will, therefore, be seen that the service retardation controller 21 is aptly termed and said to be of the "brake valve" type, for as has been explained, it is effective to initiate an application of the brakes, to lap and hold the brakes applied and also to release the brakes.

If the operator desires to increase the degree of service application and accordingly also the rate of retardation of the vehicle, or if he desires to initiate a service application of the brakes to an intermediate degree, he operates the brake controller handle 211 sufficiently into the service application zone to cause the contact segment 251 on the controller drum 22 to engage contact member 242. Since contact member 251 is connected to the contact segment 254, which is constantly connected to the positive terminal of battery 257 due to the constant engagement thereof with the contact member 247, a circuit is thereby completed for energizing the track brake relay 55 and the track brake magnet valve device 41, the circuit extending from the contact segment 251, through contact member 242, wire 273 to the point 290, whence the circuit divides into two branches, the first continuing on through wire 273 and solenoid 245 to ground, and the other extending through wire 274 and solenoid 56 of relay 55 to ground.

Since the cam 214 of the controller 22 is rotated in accordance with the operative movement of the brake controller handle 211, the movable arm 178 of the service retardation controller is moved to a position at a greater angle from the vertical position, and farther removed therefrom than in the previous instance. Separation of the contact members 179 and 181 on the movable contact arm 178 from the contact member 197 on the pendulum member 189 is accordingly effected to momentarily cause a further supply of fluid under pressure to the brake cylinder, in the manner previously described.

Energization of the solenoid of the magnet valve device 41 actuates the valve 42 to release fluid under pressure from the chamber 35 of the track brake cylinder 38 in the manner previously indicated, and as a result the track shoe 31 falls into contact with the rail 32, the simultaneous energization of the solenoid 56 of the relay 55 establishing a circuit for energizing the electro-magnet 30 carried on the track shoe 31. The circuit for energizing electro-magnet 30 extends from the supply or trolley wire 54 through the contact member or trolley 87, wire 88, contact members 59, 57 and 58 of the relay 55, wire 291, resistor 292, wire 293, electro-magnet 30, and wire 294 to ground. The resistor 292 serves to damp the rapid rise of current in the energizing circuit for electro-magnet 30 and thus prevent the sudden application of the track shoe brake.

The combined braking effect produced by the fluid pressure brake and the magnetic track brake increases the rate of retardation of the vehicle and thus causes the pendulum member 189 of the service retardation controller 21 to swing outwardly to the left to a greater extent until the contact member 197 carried by the pendulum member 189 again successively engages the contact members 179 and 181 carried on the movable contact arm 178.

The circuits previously traced for energizing the application magnet valve device 108 and the release magnet valve device 109 are thus again established, the magnet valve device 108 acting to cut off the supply of fluid under pressure from the reservoir 18 to the brake cylinder 10, and the magnet valve device 109 thereafter opening the exhaust communication from the brake cylinder to atmosphere.

Fluid under pressure is accordingly released from the brake cylinder 10 until the combined braking effect of the magnet track brake 11 and the fluid pressure brake is decreased sufficiently so that the pendulum 189 recedes toward its normal vertical position. When the pendulum member 189 recedes sufficiently toward its normal vertical position, the contact member 197 thereon disengages the contact member 181 on the movable contact arm 178 and the circuit previously traced for energizing the release magnet valve device 109 is accordingly interrupted and the valve 127 of the magnet valve device 109 actuated to cut off or close the exhaust communication for the brake cylinder 10.

As the speed of the vehicle or train of cars decreases and the braking effect exerted by the track brake shoe 31 and the fluid pressure brake tends to increase, without any change in the brake cylinder pressure or the degree of the magnetizing current of the electro-magnet 30 of the track brake shoe 31, the pendulum member 189 again swings outwardly in the left-hand direction to cause re-engagement of the contact member 197 with the contact member 181 to reclose the circuit for energizing the release magnet valve device 109 and thereby cause further release of fluid under pressure from the brake cylinder 10 until the combined braking effect produced by the fluid pressure brake and the track brake is such that the pendulum member 189 again recedes toward normal vertical position and effects disengagement of the contact member 197 from the contact member 181, whereupon the release magnet valve device 109 is again actuated to lap or close off the exhaust communication to the brake cylinder 10.

If it is desired to further increase the degree of the application and consequently the rate of retardation of the vehicle or train of cars, or if it is desired to initiate an application of the brakes to a high degree, the handle 211 of the brake controller 22 is operatively moved to full service position indicated in Fig. 5, the movable contact member 178 of the service retardation controller 21 being accordingly moved or swung outwardly to the left to its fullest extent as determined by the contour of the cam 214. It will be observed that the contact surface on the cam 214 beginning with the point corresponding to the full service position and effective thereafter is of substantially constant radius of curvature and that, therefore, no further displacement of the contact arm 178 of the service retardation controller 21 from the normal vertical position thereof greater than that for full service position is effected.

As will be seen in Fig. 8, when the brake controller handle 211 is in full service position, the contact segment 251 on the drum of the controller 252 engages the contact member 241, a circuit for energizing the dynamic brake relay 95 being thereby established. The circuit for energizing the dynamic brake relay 95 extends from the positive terminal of the battery 257 to the contact segment 251 on the drum of the controller 22 as previously described, then through contact member 241, wire 272, solenoid coil 96, and thereafter to the negative terminal of the battery 257 as through ground.

Contact member 97 of relay 95 is accordingly first actuated to circuit-opening position to interrupt the control circuit for the motoring relays 61 and 62, which relays 61 and 62 upon de-energization interrupt the circuit from the supply or trolley wire 54 through motors 13, 14, 15 and 16 to ground. Thus, regardless of whether or not the handle 321 of the motor controller 27 is retained in "power-on" position, the supply of current for driving the motors under power is interrupted automatically by the relay 95 and the control of the motors is automatically taken out of the hands of the operator.

After the contact member 97 of the relay 95 has effected interruption of the supply of current to the motors 13, 14, 15 and 16, contact member 99 and contact member 98 of the relay 95 are actuated to circuit-closing position, to respectively effect energization of the brake control relays 103 and 105, and to establish a circuit for energizing the rheostat motor 66. The circuit for energizing the relays 103 and 105 extends from the supply or trolley wire 54, contact member or trolley 87, wire 88, branch wires 385 and 386, contact member 99 of relay 95, wire 387, solenoid 388 of relay 103, wire 389, solenoid 391 of relay 105, wire 392, back contact members 393 of the motoring relay 62, wire 394, back contact members 395 of the motoring relay 61, wires 396, 397 and 398, stationary contact member 399, movable contact member 64, which has been automatically returned into contact with the contact member 399 upon de-energization of the motor 66 by the fluid pressure in chamber 72 of pressure cylinder 71, and then in parallel through the flexible lead wire 401 connected to the movable contact member 64, and through a wire 402 connected to one end of the resistor 63, to ground. The relays 103 and 105, when energized, complete a dynamic braking circuit which extends from one terminal of the motor armature 14A through a wire 404, contact members 405 of the relay 103, wire 406, wire 402, resistor 63, wires 407 and 408, contact members 409 of the relay 105, wire 410 to one terminal of the motor armature 15A of the motor 15, whence the circuit divides, part extending in series through the field 16F of the motor 16, the field 15F of the motor 15, armature 13A of the motor 13, and armature 14A of the motor 14, and the other part extending in series through the armatures 15A and 16A of the motors 15 and 16 and the fields 14F and 13F of the motors 14 and 13 respectively, the two parts rejoining at the original terminal of the motor armature 14A. As previously indicated, a circuit for energizing the rheostat motor 66 is completed by the contact member 98 in the circuit-closing position thereof on energization of the dynamic brake relay 95, the circuit extending from the supply or trolley wire 54, through the trolley 87, wire 88, wires 385 and 414, contact member 98, wire 415, contact members 85, 83 and 84 of the relay 81, shunting the resistor 86, wire 416, motor 66, through wires 397, 398, stationary contact member 399, movable contact member 64, and thence to ground. The motor 66, upon energization effects movement of the rack member 65, and, therefore, of the movable contact member 64 in the right-hand direction, against the fluid pressure in the chamber 72 of the pressure cylinder 71 and gradually shunts, that is, cuts out the resistor 63, so that the decrease in the braking current, due to the decreasing speed of the vehicle, which would otherwise occur, is substantially counteracted by the decrease in the amount of the resistance of the resistor 63 included in the braking circuit. The braking effect produced by the dynamic braking of motors 13, 14, 15 and 16 thus is automatically maintained substantially constant over a wide range of speeds.

Separation of the movable contact member 64 from the stationary contact member 399 does not effect de-energization of the brake control relays 103 and 105, nor of the motor 66, for the reason that a holding circuit for the relays and motor 66 is established from wire 397 to ground through contact members 418 and 419 of the relays 103 and 105 respectively, whenever the relays 103 and 105 are energized.

It will be observed that the contact segment 251 on the drum of the controller 22 also engages the contact member 242 of the controller when the controller handle is in full service position, and consequently the track brake relay 55 and magnet valve device 41 for the track brake 11 are also energized to effect application of the track brake shoe 31 on the rail 32.

If the combined braking effect produced on the vehicle or train of cars by the fluid pressure brake, magnetic track brake and the dynamic brake is not sufficient to produce a rate of retardation corresponding to the angular position of the movable contact arm 178 of the service retardation controller, the application magnet valve device 108 and the release magnet valve device 109 of the valve mechanism 19 will remain energized to increase the supply of fluid under pressure to the brake cylinder 10, from the reservoir 18 in the manner previously described until the rate of retardation is sufficient to produce outward swing of the pendulum member 189 in the left-hand direction from its normal vertical position sufficiently to cause the contact member 197 carried on the pendulum member 189 to engage the contact member 179 carried on the movable arm 178. The circuit for energizing the application magnet valve device 108 is thereby completed and the further supply of fluid under pressure to the brake cylinder 10 cut off as previously described.

As the speed of the vehicle or train of cars decreases and the braking effect for a given brake cylinder pressure increases, the pendulum member 189 of the service retardation controller will swing further outwardly to cause engagement of the contact member 197 and the contact member 181 to effect energization of the release magnet valve device 109 and a consequent release of fluid under pressure of the brake cylinder 10, sufficient to cause return of the pendulum member 189 toward its vertical normal position and disengagement of the contact member 197 from contact member 181 to thereby effect closing off of further exhaust of fluid under pressure from the brake cylinder 10.

If the combined braking effect produced by the fluid pressure brake, the magnetic track brake and the dynamic brakes is sufficiently great at the time the dynamic brake is made effective, to cause the pendulum member 189 to swing outwardly a sufficient degree to effect engagement of the contact member 197 with both the contact members 179 and 181, fluid under pressure is immediately released from the brake cylinder 10 to reduce the total braking effect to a degree sufficient to cause such recession of the movable arm 178 that the contact member 197 on the pendulum member 189 disengages contact member 181 and engages only the contact member 179 on the movable arm 178 of the service retardation controller, which as will be understood from previous explanation, produces the lapped condition of the fluid pressure brake. Thereafter, regulation of the pressure of the fluid in the brake cylinder 10 is automatically effected in the same manner as previously described, upon a decrease in the vehicle speed.

*Release of the brakes following a service application*

If after a service application of the brake has been effected and while the vehicle or train of cars is decelerating at a rate determined by the setting of the service retardation controller 21, it is desired to immediately release all of the brakes, and restore control of the motoring circuit to the operator, the handle 211 of the brake controller 22 is returned quickly to release position. The helical torsion spring 205 associated with the shaft 175 of the service retardation controller 21 accordingly becomes effective to return the arms 203 and 178 of the service retardation controller to their normal positions as shown in Fig. 2, the movable arm 178 engaging the strap 196 extending between the supporting arms 192 and 193 of the pendulum member 189 and effecting return movement of the pendulum member 189 together therewith to the normal vertical position as shown in Fig. 2, engagement of the contact member 197 on the pendulum member 189 with the contact members 179 and 181, on the movable arm 178 being accordingly effected.

If the handle 211 of the controller 22 were positioned in full service position to effect application of the fluid pressure brakes, the magnetic track brakes and the dynamic brakes, the disengagement of contact segment 251 on the drum of the controller 22, from the contact members 241 and 242 effects de-energization of the dynamic brake relay 95 and of relay 55 and magnet valve device 41 of the track brake equipment. Operation of the contact member 99 of relay 95 to its circuit-opening position effects interruption of the energizing circuit for the brake control relays 103 and 105, which are thus actuated to interrupt the dynamic braking circuit previously traced and to interrupt the holding circuit for the rheostat motor 66. Consequently immediately upon the interruption of the dynamic braking circuit, the pressure of the fluid in chamber 72 of the pressure cylinder 71 is effective to return the rack member 65 and movable contact member 64, associated with the resistor 63, to its extreme left-hand position in contact with stationary contact member 399. But notwithstanding the operation of the contact member 97 of relay 95 to its circuit-closing position to restore control of the motor circuit to the operator of the motor controller 27, energization of the motoring relays 61 and 62 cannot be effected until the movable contact member 64 engages stationary contact member 399, since the initial energization of the motoring relays 61 and 62 depends upon the closing of a circuit through the contact member 399 and contact member 64. Once the motoring relays 61 and 62 are energized, however, the relays 61 and 62 establish their own holding circuit as well as one for the rheostat motor 66 to maintain energization of the relays 61 and 62 and of the motor 66, independently of the separation of the movable contact member 64 from the stationary contact member 399.

The de-energization of the solenoid 45 of the magnet valve device 41 restores the communication, previously described, for the supply of fluid under pressure from the reservoir 18 through the magnet valve device 41 to the chamber 35 of the pressure cylinder 38, thereby effecting disengagement of the track shoe 31, from track rail 32. The simultaneous de-energization of the solenoid 56 of the relay 55 effects interruption of the energizing circuit for the electro-magnet 30 of the track brake shoe 31. As previously described in connection with the charging of the equipment, both the application magnet valve device 108 and the release magnet valve device 109 are energized when the brake controller handle 211 is positioned in release position, and consequently fluid under pressure is released from the brake cylinder to effect release of the fluid pressure brake.

If it is desired to graduate the release of the brake from a full service application of the brake, the operator returns the brake controller handle 211 toward release position from the full service position sufficiently to cut out only the dynamic brakes or both the dynamic brake and the magnetic brake. With the release of the dynamic brake and the magnetic track brake the rate of retardation of the vehicle will be decreased, and consequently the pendulum member 189 of the service retardation controller will recede toward its normal vertical position and effect separation of the contact member 197 on the pendulum member 189 from both contact members 179 and 181 carried on movable arm 178 of the retardation controller 21. De-energization of both the application magnet valve device 108 and release magnet valve device 109, thereby effected, will result in an increase in the supply of fluid under pressure to the brake cylinder 10 to increase the braking effect produced by the fluid pressure brake sufficiently to cause the pendulum member 189 to return outwardly in the left-hand direction away from its normal vertical position until the contact member 197 on the pendulum member 189 re-engages the contact member 179 on the movable arm 178 to effect re-energization of the magnet valve device 108 to cut off the further supply of fluid under pressure to brake cylinder 10. Regulation of the pressure of the fluid in the brake cylinder 10 according to the position of the movable arm 178 of the service retardation controller 21 as the speed of the vehicle or train of cars decreases is effected automatically by the service retardation controller in the manner previously described.

Standing brake

If the handle 211 of the brake controller 22 is allowed to remain in any position within the service application zone after the vehicle or train of cars is brought to a complete stop, a maximum degree of application of the fluid pressure brakes as determined by the pressure of equalization between the reservoir 18 and the brake cylinder 10 will be effected automatically by the service retardation controller 21. Obviously after the vehicle or train of cars has come to a stop the pendulum member 189 of the retardation controller 21 is returned by gravity to its normal vertical position. Consequently, if the brake controller handle 211 is allowed to remain in the service application zone, the movable arm 178 of the service retardation controller 21 will also remain correspondingly displaced from its normal vertical position and thus the contact member 197 on the pendulum member 189 will disengage and remain disengaged from the contact members 179 and 181 carried on the movable arm 178. Fluid under pressure will thus continue to be supplied from the reservoir 18 to the brake cylinder 10, in the manner previously described, as long as the application magnet valve device 108 and the release magnet valve device 109 continue to be de-energized.

It will be apparent, therefore, that it will be necessary to reduce the brake cylinder pressure from a relatively high value in order to effect release of the fluid pressure brake when it is desired to put the car or vehicle in motion. The time required to vent the brake cylinder from the relatively high pressure requires an appreciable length of time which will unnecessarily delay the starting of the car or vehicle. Furthermore, in most cases, as for example when the car or vehicle is on a substantially level track, the brake cylinder pressure ultimately attained is far in excess of that actually required to hold the car or vehicle against movement.

In order, therefore, to economize on the consumption of air as well as to reduce the time which would otherwise be required to release the fluid pressure brakes before being able to put the car in motion, I have provided a separate "standing brake" position, as indicated in Figs. 5 and 8, of the handle 211 of the brake controller 22, in which the controller handle 211 may be positioned instead of in release position, to prevent the building up of excessively high brake cylinder pressure after the vehicle or car is brought to a stop. While the standing brake position is illustratively shown in Figs. 5 and 8 as being located between the release position and the beginning of the service application zone, it will be understood that any other convenient location may be employed.

In operation, therefore, the handle 211 of the brake controller 22 is returned from the position it occupies during the service application toward release position, but is stopped short of release position in the standing brake position, upon the vehicle or train of cars coming to a complete stop.

In the standing brake position of the controller handle 211, the drum of the controller is so positioned that the contact segment 254 thereon engages the contact member 245 and disengages the contact member 246, the connection between the contact members 243 and 244 established by the contact segment 252 in the service application zone of the brake controller 22 and by the contact segment 253 for the release position being broken. The engagement of the contact segment 254 with the contact member 245 completes a circuit for energizing the application magnet valve device 108, independently of the separation of the contact member 197 on the pendulum member 189 from the contact members 179 and 181 on the movable arm 178 of the service retardation controller 21, the circuit extending from the positive terminal of the battery 257 to the contact segment 254 as previously described, thence through contact member 245, wire 263, solenoid 123 of the application magnet valve device 108, and to the negative terminal of the battery 257 as through ground. The opening of the connection between the contact members 243 and 244 on the controller 222 interrupts the circuit for energizing the release magnet valve device 108, independently of the relation of the contact members of the pendulum member 189 and movable arm 178 of the service retardation controller 21.

It will thus be seen that the application magnet valve device 108 is actuated to closed position to cut off the supply of fluid under pressure therethrough to the brake cylinder, and that the release magnet valve device 109 is actuated to closed position to close the exhaust communication for the brake cylinder 10.

Separation of the contact segment 254 from the contact member 246 of the controller 22, however, effects de-energization of the solenoid 146 of the by-pass magnet valve device 111, and as a result the valve 139 of the magnet valve device 111 is unseated from its valve seat 145 to establish communication for the flow of fluid under pressure from the reservoir 18 to the brake cylinder 10 under the control of the cut-off valve device 112, this communication extending fom the main reservoir 18 through the pipe 49, branch pipe and passage 122, branch passage 149, chamber 143 of the by-pass magnet valve device 111, past the unseated valve 139, chamber 141, passage 151, chamber 152 of the cut-off valve device 112, past the unseated valve 157, through the bore 156, chamber 164, and passage 117. Fluid under pressure, thus supplied to the brake cylinder 10, is effective in the chamber 154 of the cut-off valve device 112 when the brake cylinder pressure attains a predetermined uniform value, such as 20 pounds per square inch, adequate to cause application of fluid pressure brakes to such a degree as to hold the car or vehicle against movement in most instances, to actuate the piston 153 against the tension of the spring 161, to move the valve 157 into seated relation on its valve seat 158 to cut off the further supply of fluid under pressure to the brake cylinder 10.

When it is desired to put the car in motion, the brake controller handle 211 is shifted into release position. In the release position of the controller handle 211, the drum of the controller 22 is correspondingly positioned so that the contact segment 254 reengages the contact member 246 to re-establish the circuit for energizing the solenoid 146 of the by-pass magnet valve device 111, and thereby effect actuation of the valve 139 to close the communication previously established thereby for the supply of fluid under pressure to the brake cylinder.

Due to the restoration of the movable contact arm 178 of the service retardation controller 21 to the normal vertical release position thereof in which the contact member 197 on the pendulum member 189 again engages both contact members 179 and 181 on the movable arm 178, the circuits, previously traced, for effecting energization of the application magnet valve device 108 and the release magnet valve device 109 are again established.

Since both the by-pass magnet valve device 111 and the application magnet valve device 108 are actuated to closed position to prevent the supply of fluid under pressure to the brake cylinder 10 and since the release magnet valve device 109 is actuated to open the exhaust communication to the brake cylinder 10, the fluid pressure brake will be released upon complete venting of the brake cylinder from the 20 pounds per square inch pressure.

If the operator finds that the degree of the application of the fluid pressure brake, effective with the brake controller handle 211 in standing brake position, is insufficient to hold the car stopped against movement, as when the vehicle or car is stopped on a relatively steep grade or incline, and that the vehicle or car tends to creep despite the application of the standing brake, he may immediately operate the handle 211 of the brake controller 22 sufficiently into the service application zone to restore the control of the flow of fluid under pressure to the brake cylinder to the application magnet valve device 108, so that fluid under pressure may be supplied to the brake cylinder independently of the cut-off valve device 112. Then by permitting the handle 211 of the controller 22 to remain somewhere in the service application zone, the maximum brake cylinder pressure will be attained, in the manner previously described, due to the continued separation of the contact member 197 on the pendulum member 189 from both the contact members 179 and 181 on movable arm 178 of the service retardation controller 21.

*Manual emergency application*

If the operator desires to effect an emergency application of the brakes manually at a time when the equipment is conditioned as shown in Fig. 1, and the vehicle or train of cars is traveling under power along the road, he quickly operates the handle 211 of the brake controller 22 from release position into emergency position. As will be seen in Fig. 8, segment 254 on the drum of controller 22 disengages the contact member 248 in the emergency position of the controller handle 211 and consequently the connection from the positive terminal of battery 257 to the contact member 197 on the pendulum member 189 of the service retardation controller 21 is interrupted. Thus the circuits, previously traced, for energizing the application magnet valve device 108 and release magnet valve device 109 are interrupted and de-energization of the magnet valve devices accordingly effected. At the same time the service retardation controller 21 is rendered inoperative to limit, regulate or in any manner control the rate of retardation of the vehicle or train of cars according to the degree of operative movement of the handle 211 of the brake controller 22.

Upon the de-energization of the application magnet valve device 108 and the release magnet valve device 109, fluid under pressure is supplied from the main reservoir 18 to the brake cylinder 10, in the manner previously described, to effect application of the fluid pressure brakes.

In the emergency application position of the brake controller handle 211, the contact segment 251 on the drum of the controller engages both contact member 241 and contact member 242, and thus energization of the dynamic brake relay 95 and of the relay 55 and magnet valve device 41 of the track brake equipment and the consequent application of the dynamic brake 12 and of the magnetic track shoe brake 11 is effected, in the manner previously described. As previously noted, the movable arm 178 of the emergency retardation controller 23 is maintained in displaced relation at an angle to the vertical position normally occupied by the pendulum member 189, which angle is greater than the maximum angle of displacement of the movable arm 178 of the service retardation controller 21. Thus since the service retardation controller 21 is inoperative to limit or regulate the rate of retardation of the vehicle with the brake controller handle 211 in emergency application position, the pendulum member 189 of the emergency retardation controller swings outwardly in the left-hand direction according to the rate of retardation of the vehicle until the contact member 197 carried by the pendulum member 189 thereof engages the contact member 179 carried on the movable arm 178. The engagement of the contact members 197 and 179 of the emergency retardation controller 23 completes a circuit for energizing the application magnet valve device 108 which is accordingly actuated to cut off the further supply of fluid under pressure to the brake cylinder 10, the circuit extending from the positive terminal of battery 257 through wires 259 and 269, terminal bolt 199 of emergency retardation controller 23, flexible wire 198, contact member 197, contact member 179, flexible wire 182, terminal bolt 184 of the emergency retardation controller 23, wires 271 and 263, solenoid 123 of the application magnet valve device 108 and thence to the negative terminal of battery 257 as through ground.

As the speed of the vehicle diminishes under the combined effect of the fluid pressure brake, the magnetic track shoe brake and the dynamic brake, and as the braking effect produced by a given brake cylinder pressure increases accordingly due to the increase in the co-efficient of friction between the co-operating elements of the fluid pressure operated wheel-brake, the pendulum member 189 swings outwardly to a greater extent to effect engagement of the contact member 197 with the contact member 181 of the emergency retardation controller. The engagement of the contact member 197 with the contact member 181 of the emergency retardation controller completes a circuit for energizing the release magnet valve device 109 which is accordingly actuated to open the exhaust communication from the brake cylinder 10 and thereby reduce the brake cylinder pressure, the circuit extending from the positive terminal of battery 257 to the contact member 197 as previously traced, thence through the contact member 181, flexible wire 183 and terminal bolt 185 of the emergency retardation controller 23, wire 270, solenoid 135 of the release magnet valve device 109, and thence to the negative terminal of battery 257, as through ground.

When the brake cylinder pressure is reduced sufficiently to cause the recession of the pendulum member 189 toward its vertical position far enough to disengage contact members 197 and 181, the energizing circuit for the release magnet valve device 109 is interrupted and the exhaust communication from the brake cylinder thus closed to cut off further reduction in brake cylinder pressure.

Since the movable arm 178 of the emergency retardation controller 23 is displaced at a greater angle from the vertical than the maximum angle of displacement of the corresponding arm 178 of the service retardation controller 21, it will be apparent that the rate of retardation, as limited and regulated by the emergency retardation controller 23, is higher than the maximum rate of retardation as limited and regulated by the service retardation controller 21.

The rate of retardation as determined by the emergency retardation controller 23 may be varied by varying the angular displacement of the movable arm 178 from the vertical by adjusting the position of the toothed segment 233 relative to the toothed member 234. It will thus be seen that the rate of retardation as determined by the emergency retardation controller is not a definite fixed value, but that it may be any one of a plurality of values depending upon the degree of angular displacement of the movable arm 178 from the vertical and as indicated on the scale 226.

Release of the brakes following manual emergency application

The release of the brakes following an emergency application of the brake, which has been manually effected in the manner just described, may be effected similarly as for service applications of the brakes, by returning the brake controller handle 211 toward release position. As soon as the brake controller handle 211 re-enters the service application zone, the contact member 254 on the drum of the brake controller 22 re-engages the contact member 248 and thereby reconnects the positive terminal of battery 257 to the contact member 197 on the pendulum member 189 of the service retardation controller 21. Since the movable arm 178 of the service retardation controller 21 is displaced a lesser angle from the vertical than the movable arm 178 of the emergency retardation controller 23, and since the pendulum member 189 of the service retardation controller is swung out in the left-hand direction an angle corresponding to that of the pendulum member 189 of the emergency retardation controller, it follows that the circuits, previously traced, for energizing the application and release magnet valve devices 108 and 109, respectively, under the control of the service retardation controller 21 are again established. Consequently, since the energization of the release magnet valve device 109 opens the exhaust communication for the brake cylinder 10, the brake cylinder pressure is reduced until the combined braking effect of the fluid pressure brake, the magnetic track shoe brake and the dynamic brake, or of the fluid pressure brake and the magnetic track shoe brake, depending upon the degree to which the brake controller handle 211 has been returned into the service application zone, is reduced sufficiently to permit the recession of the pendulum member 189 of the service retardation controller 21 toward the vertical position thereof to disengage the contact member 197 from the contact member 181 and thereby interrupt the circuit for energizing the release magnet valve device 109. De-energization of magnet valve device 109 causes actuation thereof to close off the exhaust communication for the brake cylinder 10.

Upon the return of the brake controller handle 211 into release position, energization of the application magnet valve device 108 and of the release magnet valve device 109 to cause release of the fluid pressure brake is effected as in the case of release of the brakes following a service application of the brake, de-energization of the dynamic brake relay 95 and of the track brake relay 55 and magnet valve device 41 also being effected to cause release of the dynamic brake and magnetic track shoe brake.

Automatic emergency application of the brakes

Assuming that the vehicle or train of cars is traveling under power along the road, with the equipment conditioned as shown in Fig. 1, an automatic emergency application of the brakes is effected in the event that the operator removes his hand from the lever 321 of the motor controller 27, or relieves the pressure thereon sufficiently, and thus causes the valve 339 to be actuated upwardly from its lower seated position on the valve seat 344 into seated relation on the upper seat 348. The supply of fluid under pressure from the main reservoir 18 to the safety control pipe 26 is thus cut off at the valve seat 348 and the safety control pipe is vented to atmosphere through chamber 352 of the foot-valve device 28, past the unseated diaphragm valve 356, chamber 357, pipe and passage 345, chamber 341 of the motor controller 27, past the valve 339 and valve seat 344, and through chamber 346.

The fluid pressure operated relay 25 is thus actuated in response to the reduction in safety control pipe pressure to move the contact members 308 and 309 into circuit-closing position and the contact members 306 and 307 into circuit-opening position. Thus, independently of the position of the brake controller handle 211, or of the condition of the service retardation controller 21, the circuits previously traced for effecting energization of the application magnet valve device 108 of the release magnet valve device 109 under the control of the service retardation controller 21 are interrupted at the contact members 306 and 307 and the supply of fluid under pressure from the reservoir 18 to the brake cylinder 10 effected in the manner previously described.

The contact members 308 and 309 of relay device 25, in the circuit-closing position thereof connect the positive terminal of the battery 257 to the wires 272 and 273, respectively, which wires lead to the dynamic brake relay 95 and to the relay 55 and magnet valve device 41 for the track brakes, the circuits being sufficiently apparent in Fig. 1, and from previous description to require no specific tracing thereof. Application of the dynamic brake 12 as well as of the magnetic track shoe brake 11 is therefore effected.

Since the circuits controlled by the service retardation controller 21 are interrupted at the contact members 306 and 307 of the relay device 25, it follows that the service retardation controller 21 is ineffective to limit or regulate the rate of retardation of the vehicle or train of cars at this time, and that therefore, the emergency retardation controller 23 will function as in the case of a manually effected emergency application of the brakes, to limit and regulate the rate of retardation of the vehicle or train of cars.

In a similar manner, if the foot pedal 362 of the foot valve device 23 has been depressed to close the diaphragm valve 356 and unseat the valve 359 to maintain the safety control pipe pressure while handle 321 of the motor controller 27 is raised, the safety control pipe pressure would be reduced to atmosphere in the event that the pressure on the foot pedal 362 is removed or released sufficiently to permit the diaphragm valve 356 to be unseated.

In a similar manner also, the conductor's valve device 29 may be operated to unseat the valve 375 thereof and vent the safety control pipe 26 to atmosphere through pipe and passage 374, chamber 373 of the conductor's valve device 29, past the unseated valve 355 and through the atmospheric chamber 372.

In any case of reduction in the pressure of the safety control pipe 26, therefore, whether effected by means of the motor controller 27, the foot valve device 28 or the conductor's valve 29, an emergency application of the brakes will be effected automatically.

If the brake controller handle 211 is in release position, release of the brakes following an automatic emergency application of the brakes may be effected by restoration of the safety control pipe pressure.

Summary

Summarizing, my present invention is embodied in a vehicle brake equipment having a fluid pressure operated brake, a magnetic track shoe brake, and a dynamic brake.

An inertia operated service retardation controller of the brake valve type and an inertia operated emergency retardation controller not of the brake valve type are provided for controlling only the fluid pressure brake.

A manually operative brake controller is provided for operating the service retardation controller to initiate an application of the fluid pressure brakes, and to selectively adjust the service retardation controller for different rates of retardation, according to the degree of operative movement of the manual controller into a service application zone. The manual controller is operative to cause application of the fluid pressure brake, the magnetic track shoe brake and the dynamic brake in sequence, according to the degree of operative movement into the service application zone to effect different degrees of braking.

When the fluid pressure operated brake functions alone, the service retardation controller automatically limits and regulates the degree of the braking effect produced by the fluid pressure brake according to the setting of the retardation controller. With the magnetic track shoe brake or both the magnetic track shoe brake and the dynamic brake applied in addition to the fluid pressure brake, the service retardation controller is responsive to the rate of retardation produced on the vehicle by all of the brakes to regulate automatically that portion of the total braking effect produced by the fluid pressure brake to a degree merely sufficient to supplement the braking effect produced by the other brake or brakes in order that the selected rate of retardation as determined by the setting of the retardation controller may be obtained.

The emergency retardation controller is set for a higher rate of retardation than the maximum rate of retardation as determined by the service retardation controller. The emergency retardation controller is in constant readiness to limit and regulate the fluid pressure brakes according to the rate determined thereby, but it is not operative ordinarily, during service applications of the brakes, to determine the rate of retardation of the vehicle, because the service retardation controller functions first at a lower rate of retardation to limit and regulate the rate of retardation according to the setting thereof.

Upon operation of the manually operated brake controller to emergency position, application of the magnetic track shoe brake and of the dynamic brake is effected as for service applications and the service retardation controller is electrically cut out, the application of the fluid pressure brake being thereby initiated. The emergency retardation controller is thus permitted to function to limit and regulate the rate of retardation of the vehicle.

A relay device operative in response to reduction in safety control pipe pressure is provided for automatically effecting application of the fluid pressure brake, the magnetic track shoe brake, and the dynamic brake independently of the position of the manual brake controller or of the service retardation controller, the service retardation controller being thereby cut out and the emergency retardation controller permitted to function, as in the manual emergency application of the brakes, to limit and regulate the rate of retardation. Deadman's and conductor's valve devices are provided for effecting reduction in the safety control pipe pressure.

The present invention also includes means whereby the fluid pressure brake may be applied to a degree which is only a fraction of the full degree thereof, while the vehicle or car is stopped or standing. Such means comprises a magnet valve device and a cut-off valve device for controlling the supply of fluid under pressure to operate the fluid pressure brake, the magnet valve device being under the control of the manually operative brake controller. When the manually operative brake controller is in standing brake position, which is located outside of the service application zone, the magnet valve device just mentioned is operative to establish a by-pass communication around the usual application magnet valve device, through which bypass communication fluid under pressure is supplied to operate the fluid pressure brake, the cutoff valve device functioning automatically to limit the pressure of the fluid supplied to operate the fluid pressure brake to a fraction of the maximum pressure attainable.

While only one illustrative embodiment of my invention has been shown and described, it will be understood that various omissions, additions or changes therein may be made without departing from the spirit of the invention. It is not my intention, therefore, to limit the scope of my present invention except as it is necessitated by the scope of the prior art.

Having now described my invention, what I claim as new and desire to secure by Letters Patent, is:

1. In a vehicle brake system, in combination, a fluid pressure brake equipment, a magnetic track shoe brake equipment, a dynamic brake equipment, a manually operable element for controlling the operation of all the brake equipments to cause application and release of the brakes, a pipe normally charged with fluid under pressure, and means operably responsive to a reduction of pressure in said pipe for effecting the operation of all the brake equipments to cause application of the brakes independently of said manually operable element.

2. In a vehicle brake system, in combination, a fluid pressure brake equipment, a magnetic track shoe brake equipment, a dynamic brake equipment, a manually operable element for sequentially effecting operation first of said fluid pressure brake equipment, then simultaneous operation of the fluid pressure brake equipment and one of the other brake equipments, and finally simultaneous operation of all the brake equipments, to cause application of the brakes, a pipe normally charged with fluid under pressure, and means operably responsive to a reduction of pressure in said pipe for effecting simultaneous operation of all the brake equipments to cause application of the brakes.

3. In a vehicle brake system, in combination, fluid pressure brake equipment, two separate electric brake equipments, a retardation controller operative manually to effect the operation of the fluid pressure brake equipment to cause application and release of the brakes and operative automatically according to the rate of change in speed of the vehicle to control the operation of the fluid pressure brake equipment to so control the degree of application of the brakes as to regulate the retardation of the vehicle to a selected rate, manually operable means for manually operating the retardation controller and effective to control the operation of the two separate electric brake equipments to cause application and release of one or both of the brakes.

4. In a vehicle brake system, in combination, a fluid pressure brake equipment, a magnetic track shoe brake equipment, a dynamic brake equipment, a retardation controller operative manually to effect the operation of the fluid pressure brake equipment to cause application and release of the brakes and operative automatically according to the rate of change in speed of the vehicle to control the operation of the fluid pressure brake equipment to so control the degree of application of the brakes as to regulate the retardation of the vehicle to a selected rate, manually operable means for manually operating the retardation controller and for controlling the operation of the magnetic track shoe brake equipment and of the dynamic brake equipment to cause application and release of one or both of the brakes.

5. In a vehicle brake system, in combination, a brake cylinder, a magnetic track shoe brake equipment, a dynamic brake equipment, magnet valve means controlling the supply of fluid under pressure to and the release of fluid under pressure from the brake cylinder to effect application and release of the brakes, a retardation controller manually operative to control the operation of the magnet valve means to cause application and release of the brakes and operatively responsive to the rate of change in speed of the vehicle for causing operation of the magnet valve means to control the brake cylinder pressure so as to limit and regulate the retardation of the vehicle to a selected rate, and manually operative means for manually operating the retardation controller and for controlling the operation of the magnetic track shoe brake equipment and dynamic brake equipment to cause application and release of the brakes.

6. In a vehicle brake system, in combination, a brake cylinder, a magnetic track shoe brake equipment, a dynamic brake equipment, magnet valve means controlling the supply of fluid under pressure to and the release of fluid under pressure from the brake cylinder to effect application and release of the brakes, a retardation controller manually operative to control the operation of the magnet valve means to cause application and release of the brakes and operatively responsive to the rate of change in speed of the vehicle for causing operation of the magnet valve means to control the brake cylinder pressure so as to limit and regulate the retardation of the vehicle to a selected rate, manually operative means for manually operating the retardation controller and for controlling the operation of the magnetic track shoe brake equipment and dynamic brake equipment to cause application and release of the brakes, a pipe normally charged with fluid under pressure, and means operably responsive to a reduction in pressure in said pipe for simultaneously effecting operation of the magnet valve means, the magnetic track shoe brake equipment and the dynamic brake equipment to effect application of all the brakes.

7. In a brake system for a vehicle having a propelling motor and a manually operable controller for controlling the supply of driving power to the motor, in combination, a fluid pressure brake equipment, a magnetic track shoe brake equipment, equipment operative to effect dynamic braking of the motor, a manually operable brake controller for controlling the operation of the fluid pressure brake equipment, the magnetic track shoe brake equipment, and the equipment for effecting dynamic braking of the motor to cause application and release of one or more of the separate brakes, and means operative only when the equipment for effecting dynamic braking of the motor is operated to cause application of the brakes, for rendering the manually operable motor controller ineffective to cause driving power to be supplied to the motor.

8. In a vehicle brake system, in combination, brake operating equipment, a retardation controller manually operative for controlling the operation of the brake operating equipment to cause application and release of the brakes and for selecting a rate of retardation for the vehicle, and operatively responsive to the rate of change in speed of the vehicle for effecting the operation of the brake operating equipment to so control the degree of application of the brakes as to regulate the rate of retardation of the vehicle to the rate selected, manually operable means operative to effect operation of the brake operating equipment to cause an application of the brakes and to render the said retardation controller ineffective to control the brake operating equipment, and a second retardation controller operatively responsive to the rate of change in the speed of the vehicle and effective when the first retardation controller is ineffective to control the brake operating equipment for effecting operation of the brake operating equipment to so control the degree of the application of the brakes as to regulate the rate of retardation of the vehicle to a certain uniform rate.

9. In a vehicle brake system, in combination, brake operating equipment, a retardation controller manually operative for controlling the operation of the brake operating equipment to cause application and release of the brakes and for selecting any rate of retardation for the vehicle up to a certain maximum rate, and operatively responsive to the rate of change in speed of the vehicle for effecting the operation of the brake operating equipment to so control the degree of application of the brakes as to regulate the rate of retardation of the vehicle to the rate selected, manually operable means operative to effect operation of the brake operating equipment to cause an application of the brakes and to render the said retardation controller ineffective to control the brake operating equipment, and a second retardation controller operatively responsive to the rate of change in the speed of the vehicle and effective when the first retardation controller is ineffective to control the brake operating equipment for effecting operation of the brake operating equipment to so control the degree of the application of the brakes as to regulate the rate of retardation of the vehicle to a certain uniform rate higher than the maximum rate determinable by the first retardation controller.

10. In a vehicle brake system, in combination, magnet valve means operative to cause application and release of the brakes, two normally closed circuits on which said valve means operates, a retardation controller normally maintaining said circuits closed and manually operative to interrupt said circuits successively to effect operation of the magnet valve means to initiate application of the brakes, said retardation controller being operatively responsive to the rate of change in speed of the vehicle to successively close said circuits in the reverse order to which they were interrupted for effecting operation of the magnet valve means to respectively lap and release the brakes and thereby so control the degree of application of the brakes as to regulate the rate of retardation of the vehicle to a uniform rate, manually operable means for operating the retardation controller and effective upon a certain uniform degree of movement out of its normal release position for rendering the retardation controller ineffective to control said circuits, and inertia responsive means effective to control the said circuits when the said retardation controller is ineffective to do so, for effecting operation of the magnet valve means to so control the degree of application of the brakes as to regulate the rate of retardation of the vehicle to a uniform rate.

11. In a vehicle brake system, in combination, brake operating equipment, a retardation controller manually operative for controlling the operation of the brake operating equipment to cause application and release of the brakes and for selecting a rate of retardation for the vehicle, and operatively responsive to the rate of change in speed of the vehicle for effecting the operation of the brake operating equipment to so control the degree of application of the brakes as to regulate the rate of retardation of the vehicle to the rate selected, a pipe normally charged with fluid under pressure, means operably responsive to a reduction in pressure in said pipe for independently controlling the operation of the brake operating equipment to cause an application of the brakes and for rendering the said retardation controller ineffective to control the operation of the brake operating equipment, and a second retardation controller operatively responsive to the rate of change in the speed of the vehicle and effective when the first retardation controller is ineffective to control the brake operating equipment for effecting operation of the brake operating equipment to so control the degree of the application of the brakes as to regulate the rate of retardation of the vehicle to a certain uniform rate.

12. In a vehicle brake system, in combination, brake operating equipment, a retardation controller manually operative for controlling the operation of the brake operating equipment to cause application and release of the brakes and for selecting a rate of retardation for the vehicle, and operatively responsive to the rate of change in speed of the vehicle for effecting the operation of the brake operating equipment to so control the degree of application of the brakes as to regulate the rate of retardation of the vehicle to the rate selected, manually operable means operative to effect operation of the brake operating equipment to cause an application of the brakes and to render the said retardation controller ineffective to control the brake operating equipment, a pipe normally charged with fluid under pressure, means operably responsive to a reduction in pressure in said pipe for independently controlling the operation of the brake operating equipment to cause an application of the brakes and for rendering the said retardation controller ineffective to control the operation of the brake operating equipment, and a second retardation controller operatively responsive to the rate of change in the speed of the vehicle and effective when the first retardation controller is ineffective to control the brake operating equipment for effecting operation of the brake operating equipment to so control the degree of the application of the brakes as to regulate the rate of retardation of the vehicle to a certain uniform rate.

13. In a vehicle brake system, in combination, magnet valve means operative to cause application and release of the brakes, two normally closed circuits on which said valve means operates, a retardation controller normally maintaining said circuits closed and manually operative to interrupt said circuits successively to effect operation of the magnet valve means to initiate application of the brakes, said retardation controller being operatively responsive to the rate of change in speed of the vehicle to successively close said circuits in the reverse order to which they were interrupted for effecting operation of the magnet valve means to respectively lap and release the brakes so as to regulate the rate of retardation of the vehicle to a uniform rate, a pipe normally charged with fluid under pressure, circuit-controlling means operatively responsive to a reduction of pressure in said pipe for interrupting both said circuits independently of the retardation controller and for rendering the retardation controller ineffective to control said circuits, and inertia responsive means effective to control the circuits when the retardation controller is ineffective to do so, for effecting operation of the magnet valve means to so control the degree of application of the brakes as to regulate the rate of retardation of the vehicle to a uniform rate.

14. In a vehicle brake system, in combination, valve means operative to cause application and release of the brakes, a retardation controller operative manually to control the operation of the valve means to initiate an application of the brakes and operatively responsive to the rate of change in speed of the vehicle for thereafter controlling the operation of the valve means to control the degree of application of the brakes so as to regulate the rate of retardation of the vehicle to a uniform rate, and manually operable means for manually operating the retardation controller and effective upon a predetermined degree of movement out of its normal position to render the retardation controller ineffective to control the operation of the said valve means.

15. In a vehicle brake system, in combination, valve means operative to cause application and release of the brakes, a retardation controller operative manually to control the operation of the valve means to initiate an application of the brakes and operatively responsive to the rate of change in speed of the vehicle for thereafter controlling the operation of the valve means to control the degree of application of the brakes so as to regulate the rate of retardation of the vehicle to a uniform rate, and manually operable means for manually operating the retardation controller and effective upon a predetermined degree of movement out of its normal position to effect operation of the valve means to cause application of the brakes independently of the retardation controller and simultaneously to render the retardation controller ineffective to control the operation of the valve means.

16. In a vehicle brake system, in combination, a brake cylinder, manually operable brake controlling means normally in brake release position, and operative over an application zone, valve means operative to cause fluid under pressure to be supplied to the brake cylinder to produce a full pressure therein when the manually operable means is in the application zone, valve mechanism operative to cause fluid under pressure to be supplied to the brake cylinder when the manually operable means is in a certain position outside the application zone and other than the release position, and pressure responsive means operatively responsive to a certain brake cylinder pressure which is less than said full pressure for cutting off the further supply of fluid under pressure to the brake cylinder when the supply is effected under the control of said valve mechanism.

17. In a vehicle brake system, in combination, a brake cylinder, an application valve device operative to open a first communication through which fluid under pressure may be supplied to the brake cylinder, a by-pass valve device operative to open a second communication through which fluid under pressure may be supplied to the brake cylinder, a release valve device operative to close a third communication through which fluid under pressure is vented from the brake cylinder, manually operable means for controlling the operation of said valve devices, and effective in one position to cause operation only of said application valve device and said release valve device, whereby fluid under pressure is supplied to the brake cylinder through said first communication to produce full pressure in the brake cylinder, and effective in another position to cause operation of only said by-pass valve device and said release valve device, whereby fluid under pressure is supplied to the brake cylinder through said second communication, and a cut-off valve device operably responsive to a brake cylinder pressure less than the full brake cylinder pressure for closing said second communication.

18. In a vehicle brake system, in combination, valve mechanism for controlling application and release of the brakes, a retardation controller operative manually to effect operation of the valve mechanism to initiate application of the brakes and operative automatically according to the rate of change in speed of the vehicle for thereafter effecting operation of the valve mechanism to so control the degree of application of the brakes as to regulate the rate of retardation of the vehicle to a selected rate, manually operable means operative from a normal position thereof to a certain position in which it renders said retardation controller ineffective to control the valve mechanism and simultaneously effects operation of the valve mechanism to cause application of the brakes, and means effective when said manually operable means is in said certain position for limiting the application of the brakes to a certain uniform degree.

19. In a vehicle brake system, in combination, brake operating means, a retardation controller manually operative to cause operation of the brake operating means to initiate application of the brakes and operative according to the rate of change in speed of the vehicle for thereafter effecting operation of the brake operating means to so control the degree of application of the brakes as to regulate the rate of retardation produced on the vehicle to a selected rate, manually operable means for manually operating the retardation controller and effective in a certain position removed from the normal position thereof for effecting operation of the brake operating means to initiate application of the brakes independently of the retardation controller, and means effective when said manually operable means is in said certain position for limiting the application of the brakes to a certain uniform degree.

20. In a vehicle brake system, in combination, brake means, a manually movable brake control handle, a retardation controller device responsive to movement of said handle for effecting and controlling operation of said brake means, and a switch device movable from a first position to a second position for independently effecting operation of said brake means and for rendering said retardation controller device ineffective to effect and control operation of said brake means.

21. In a vehicle brake system, in combination, brake means, a manually movable brake control handle, a retardation controller device responsive to movement of said handle for effecting and controlling operation of said brake means, a switch device movable from a first position to a second position for independently effecting operation of said brake means and for rendering said retardation controller device ineffective to effect and control operation of said brake means, and means operated upon a decrease in pressure for operating said switch device from said first position to said second position.

22. In a vehicle brake system, in combination, brake means, a manually movable brake control handle, a retardation controller device responsive to movement of said handle for effecting and controlling operation of said brake means, a switch device movable from a first position to a second position for independently effecting operation of said brake means and for rendering said retardation controller device ineffective to effect and control operation of said brake means, and a second retardation controller device rendered effective when said switch device is in said second position for controlling the operation of said brake means thereby effected.

23. In a vehicle brake system, in combination, brake means, a manually movable brake control handle, a retardation controller device responsive to movement of said handle for effecting and controlling operation of said brake means, a switch device movable from a first position to a second position for independently effecting operation of said brake means and for rendering said retardation controller device ineffective to effect and control operation of said brake means, means operated upon a decrease in pressure for operating said switch device from said first position to said second position, and safety control means operable to effect a decrease of pressure to cause operation of said last mentioned means.

24. In a vehicle brake system, in combination, brake means, a manually movable brake control handle, an element positionable according to the degree of movement of said handle, means responsive to positioning of said element for effecting operation of said brake means, means responsive to the rate of retardation of the vehicle for coacting with said element to control the degree of operation of said brake means to limit the rate of retardation of the vehicle according to positioning of said element, a normally charged pipe, and means operated upon a decrease of pressure in said pipe for effecting operation of said brake means independently of movement of said element.

25. In a vehicle brake system, in combination, brake means, a manually movable brake control handle, an element positionable according to the degree of movement of said handle, means responsive to positioning of said element for effecting operation of said brake means, means responsive to the rate of retardation of the vehicle for coacting with said element to control the degree of operation of said brake means to limit the rate of retardation of the vehicle according to positioning of said element, a normally charged pipe, means operated upon a decrease of pressure in said pipe for effecting operation of said brake means independently of movement of said element, and means effective upon operation of said last means and responsive to the rate of retardation of the vehicle for so controlling the operation of the brake means as to limit the rate of retardation of the vehicle to a degree higher than is determinable by the positioning of said element.

26. In a vehicle brake system, in combination, electric brake means, fluid pressure brake means, a brake control handle, a retardation controller device operable in response to movement of said handle to initiate and control the degree of operation of said fluid pressure brake means, and switch means operable from one position to another to render said retardation controller device ineffective and to independently thereof effect operation of both said electric and fluid pressure brake means.

JOHN W. LOGAN, Jr.